United States Patent [19]
Jackson

[11] 4,026,166
[45] May 31, 1977

[54] TRACTION DRIVE

[75] Inventor: Andrew Jackson, Princeton, N.J.

[73] Assignee: Mobil Oil Corporation, New York, N.Y.

[22] Filed: Feb. 2, 1976

[21] Appl. No.: 654,125

[52] U.S. Cl. .................... 74/691; 74/796
[51] Int. Cl.² ........................ F16N 15/16
[58] Field of Search .......... 74/191, 193, 199, 201, 74/690, 691, 796, 200

[56] References Cited

UNITED STATES PATENTS

| 941,856 | 11/1909 | Chisholm | 74/191 |
|---|---|---|---|
| 1,267,321 | 5/1918 | George | 74/691 |
| 1,290,184 | 1/1919 | Hare | 74/691 |
| 2,029,042 | 1/1936 | Turner | 74/691 |
| 2,079,681 | 5/1937 | Chilton | 74/191 |
| 2,353,136 | 7/1944 | Bade | 74/690 |
| 3,793,910 | 2/1974 | Nasuytis | 74/690 |
| 3,802,295 | 4/1974 | Lemmens | 74/796 |

FOREIGN PATENTS OR APPLICATIONS

| 938,917 | 10/1948 | France | 74/691 |
|---|---|---|---|

*Primary Examiner*—William L. Freeh
*Assistant Examiner*—Allan R. Burke
*Attorney, Agent, or Firm*—Charles A. Huggett; Malcolm Keen

[57] ABSTRACT

An infinitely variable ratio traction drive comprises a pair of drive cones driven in opposite directions by an input shaft. A number of intermediate drive shafts with intermediate drive cones splined onto them extend radially with respect to the input shaft so that the intermediate cones are in driving contact with the input drive cones. The intermediate shafts are connected to the output shaft by bevel gears, a planetary drive, or a traction drive or any combination of these. The drive ratio can be varied by altering the radial position of the intermediate cones on their respective shafts.

12 Claims, 4 Drawing Figures

U.S. Patent  May 31, 1977  Sheet 1 of 3  4,026,166
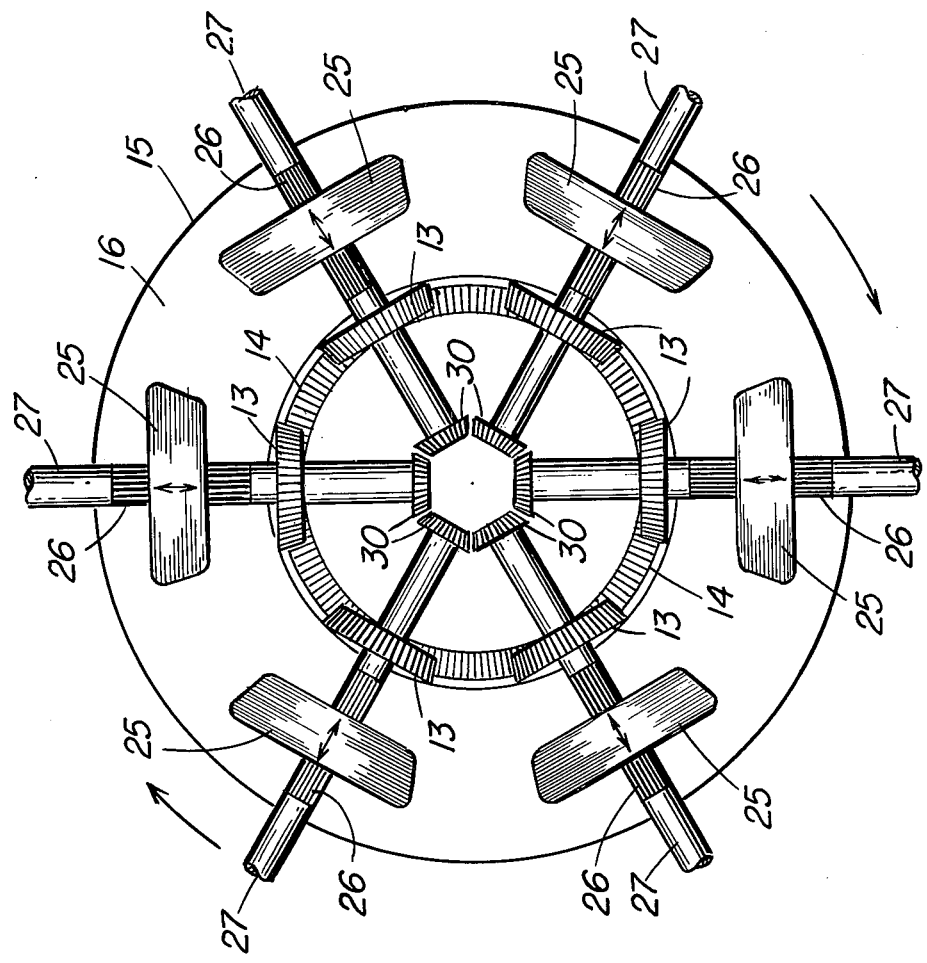
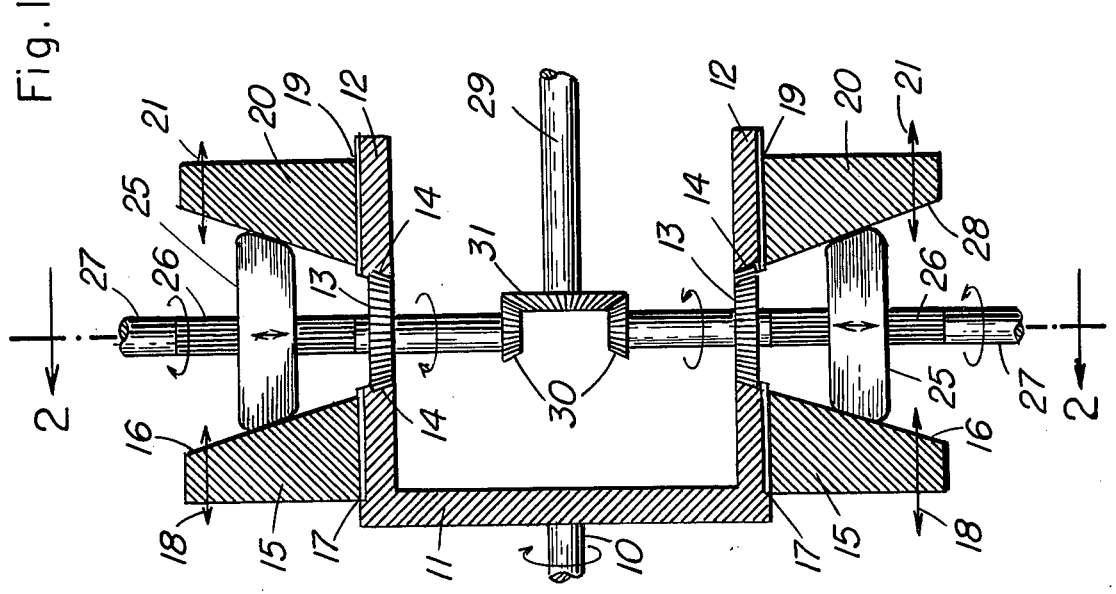

TRACTION DRIVE

BACKGROUND OF THE INVENTION

1. Field of the Invention

The invention relates to traction drives, that is, to drives or power transmissions in which the power is transmitted by means of drive members which are in frictional driving contact with each other.

2. The Prior Art

Traction drives have been known for some time and have been used in various applications. In principle, such drives are attractive from the engineering point of view because the power is transmitted by means of smooth metal rolling elements which can be moved freely with respect to one another to provide infinitely variable transmission ratios. Traction drives are also inherently quiet, with low vibration levels and produce no torsional pulsations.

On the other hand, traction drives with infinitely-variable speed ratios have generally been restricted to low power applications because they tend to slip under even moderate loads. The small contact areas necessitated by low spin requirements in infinitely variable traction drives lead to high contact pressures, especially in heavier duty applications, and this induces rolling contact fatigue which results in premature failure of the rolling elements.

Recent studies have shown that wide-range variable ratio traction drives could be attractive for automotive use since they could be capable of reducing fuel consumption by keeping the engine operating at its maximum efficiency. In addition, they are particularly attractive for use with prime movers such as turbines which are sensitive to torsional vibration.

A review of existing traction drive technology is given in the article "New and Better Traction Drives are here," R. W. Carson, Machine Design 46 (10), 148–155 (1974).

The infinitely-variable ratio traction drives in general use at the present employ point or elliptical contact to transmit traction forces. This means that contact stresses will be high or, if the size of an elliptical contact is increased to reduce the stress, the spin will also be increased with a consequent reduction in the life of the rolling elements. For example, the toroidal drive described in the article by R. W. Carson has shown the most promise in power handling capability. The size of the elliptical contact formed at the toroidal roller contacts is limited by the spin in the contact for a given range of speed ratios. For a useful ratio range the contact ellipse has a limiting size and the output torque can only be increased by increasing the contact stress. Excessive contact stress levels cause severe life reductions of the rolling elements due to contact fatigue. A balance must therefore be found between wear caused by spin and fatigue caused by high contact stress. This balance limits the power output of the toroidal type of traction drive. The toroidal drive may achieve line contact between the rolling elements but only with a very limited range of speed ratios.

BRIEF DESCRIPTION OF THE INVENTION

I have now devised a traction drive with infinitely variable ratios which has high power and torque output capabilities. The drive employs lubricated line contacts to transmit traction forces instead of point or elliptical contacts, without increasing contact spin. This reduces contact stress levels and therefore the contact fatigue life of the rolling elements is greatly increased. By keeping spin in the contact at a low level there is little or no wear of the elements. In addition, the drive is capable of providing a wide range of speed ratios.

According to the invention, the drive comprises as input drive cone which is rotatable about its axis. A number of intermediate drive cones bear on the conical face of the input drive cone and each of the intermediate drive cones is slidably mounted on an intermediate drive shaft so that the drive is transmitted to the shaft from the cone but the cone is free to move along the shaft. Splined connection is suitable but other connections may be used to reduce sliding friction. Each intermediate shaft extends radially with respect to the input drive cone and its shaft so that the intermediate cones can move across the conical drive face of the input cone, thereby enabling the speed ratio to be varied. The intermediate drive shafts are connected to an output shaft, for example, by bevel gears, a planetary gear set, a fixed ratio traction drive (e.g. a conical traction drive) or any desired combination of these.

In a preferred form, the drive includes two input cones of equal cone angle which are co-axially mounted with their conical surfaces facing each other. The first input cone is driven directly or by an input shaft and the secondary cone may either free wheel or be driven at the same rotational speed as the first cone but in the opposite direction, suitably by a bevel gear set or a traction drive. The input cone or cones include provision for relative axial movement between their conical drive faces so that the intermediate cones are always maintained in close driving contact with the input cone faces, whatever the radial position of the intermediate cones on their shafts. The axial movement between the cone faces of the input cones can be provided by a splined or keyed mounting of one or both of the input cones (or any other coupling to reduce sliding friction). In a preferred embodiment, the input cones are splined or keyed to input carriers so that the cones slide axially on the carriers.

The radial movement of the intermediate cones is accommodated by the axial movement of the input cones and in order to ensure continuous driving contact between the input cones and the intermediate cones a suitable loading system is provided. This system ensures that the input cones are urged relatively towards each other and the intermediate cones are urged radially inwards into close contact with the drive faces of the input cones. However, since the speed ratio of the drive is determined by the radial position of the intermediate cones, the relative movement of the cones is co-ordinated to ensure that driving contact is maintained at the cone position for the desired speed ratio. The loading system may be hydraulically operated or, alternatively, it may employ a torque-sensitive ball ramp (cam and ball) loading device.

The drive allows the use of line contacts and the length of the line contacts may be balanced against a maximum acceptable level of contact spin with regard to rolling element wear to allow high torque transmission with relatively low contact pressures. The positioning and movement of the cones relative to each other allows the speed of the intermediate shafts to be varied to any ratio of the input speed within a finite range. When combined with a suitable gear set connecting the intermediate shafts and an output shaft, a variable speed output of high torque and power capability can be obtained from a constant speed input.

BRIEF DESCRIPTION OF THE DRAWINGS

FIG. 1 is a vertical section of a simplified form of the traction drive,

FIG. 2 is a view along the line 2—2' of FIG. 1,

DESCRIPTION OF DETAILED EMBODIMENTS

Figure 3:
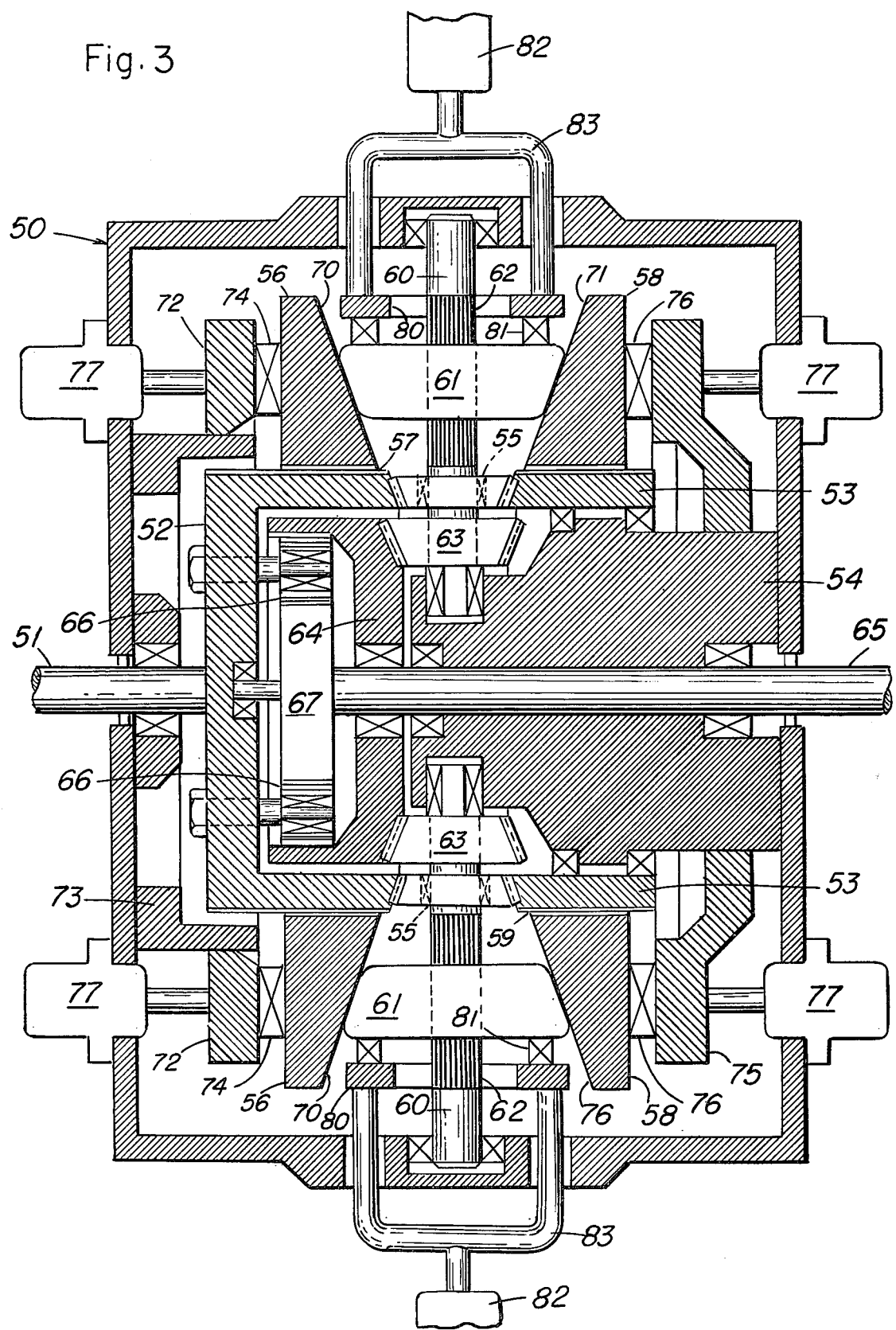
FIG. 3 is a section of a traction drive.

The traction drive shown in FIGS. 1 and 2 comprises an input shaft 10 on which is fixed an input carrier 11. A second input carrier 12 is journalled co-axially with the first carrier and driven at the same rotational speed as the first carrier but in the opposite direction by means of bevel gears 13 which engage with the toothed edges 14 of carriers 11 and 12. Mounted on the outside periphery of circular input carrier 11 is a first or primary input drive cone 15 with conical drive face 16. Cone 15 is mounted on carrier 11 by means of a splined or keyed connection 17 so that the cone is free to move axially along carrier 11 in the direction of arrows 18 but, at the same time, must rotate with the carrier. Mounted on the outside periphery of the secondary input carrier 12 by means of a similar splined or keyed connection 19 is a secondary input cone 20 with conical drive face 28 whose cone angle is equal to that of the first cone 15. The splined or keyed connection 19 permits axial movement of cone 20 in the direction of arrows 21 but ensures rotation of the cone with carrier 12. As can be seen from FIG. 1, the primary input carrier 11 is driven directly by input shaft 10 ARB and the secondary carrier driven from the primary carrier in the opposite direction at the same rotational speed.

The primary and secondary input cones 15 and 20 are separated by and loaded against a number, in this case, six intermediate drive cones 25 mounted by splined drives 26 on intermediate drive shafts 27. The axes of the intermediate drive shafts 27 are, in this case, perpendicular to the axis of the input cones and intersect it at a single point. Each intermediate cone has a cone angle equal to the supplement of the input cone angle (180° — the input cone angle). This ensures that the conical faces of the intermediate drive cones 25 are maintained in close driving frictional engagement with the conical drive faces 16 and 28 of the input drive cones. The splined drives 26 permit radial movement of the intermediate drive cones 25 along shafts 27 whilst ensuring that the cones rotate with the shafts.

Intermediate shafts 27 are coupled to output shaft 29 by means of bevel gears 30 and 31.

Variation in the speed of the intermediate shafts for a given input speed is obtained by moving the intermediate cones 25 radially along their shafts 27 and simultaneously moving the primary and secondary input cones 15 and 20 axially along their respective carriers 11 and 12 so that all the intermediate cones make contact with both input cones. Frictional driving engagement between the input cones and the intermediate cones is assured by means (not shown) for urging the input cones together towards each other and the intermediate cones radially inwards along shafts 27.

Since the intermediate cones are uniform in size and shape they can only be accommodated at the same radial position on the input cones. The input cone radius to the centre of the line contacts is hereafter called R. The speed of the intermediate shafts will vary from a minimum value when R is a minimum, $R_{min}$, to a maximum value when R is a maximum, $R_{max}$.

Although it is preferred that both input cones should be driven, as just described, the secondary input cone may simply be allowed to freewheel. This arrangement is less preferred, however, since the driving forces are then concentrated along one contact line (between cones 25 and conical driving face 16) rather then being distributed along two (between cones 25 and both conical driving faces 16 and 28). The use of two input cones is, of course, to be preferred because the inward forces on the input cones necessary to maintain driving engagement are then taken up evenly. In addition, the intermediate shafts 27 can then act as suitable journals for bevel gears 13. However, if the intermediate shafts are sufficiently sturdy to withstand the contact forces, one input cone would be enough.

The pre-requisite for proper movement of the intermediate cones and contact with the input cones is, of course, that the included angle between the conical drive faces of the input cones should equal the cone angle of the intermediate cones. In FIG. 1, the cone angle of the primary and secondary input cones is equal but if desired different cone angles may be used although in this case the intermediate shafts will have to be inclined with respect to the central axis because these shafts must necessarily bisect the included angle between the input cones. In the extreme cases, the drive face of one of the input cones may be perpendicular to the axis of the input cone. In this case, the drive to the output shaft will be by an inclined gearset or traction drive.

For zero spin along the length of the line contact the cone angles are determined such that when R is at some value between $R_{min}$ and $R_{max}$ (usually halfway) the projected apexes of all the cones (input and intermediate) will meet at a single point. When R varies from $R_{max}$ to $R_{min}$, the spin will vary from a finite positive value through zero to a finite negative value. The amount of spin is directly proportional to the length of the line contact, and hence the maximum contact length is governed by the maximum spin permissible (with regard to rolling element wear) at the extremes of the required speed ratio range. The contact length governs the traction force which can be transmitted for a given maximum contact stress set by fatigue life considerations, and hence governs the maximum torque output of the machine. The present invention enables the stresses in the contact to be reduced. Because of this, it may be possible to tolerate a certain amount of spin, and in this case the input cone angle can be increased to 180° (i.e. flat discs); the intermediate cones with then assume the form of a roller.

FIG. 3 shows a traction drive using a planetary gear set to transmit the drive to the output shaft. The drive comprises a housing 50 with an input shaft 51 journalled in it. A primary input carrier 52 is fixed to input shaft 51 and a secondary input carrier 53, journalled coaxially with the primary input carrier on hub casting 54 is driven from the primary carrier by means of bevel gears 55 which engage with matching teeth on the end faces of the two carriers. This ensures that the two carriers are driven at the same rotational speed in opposite directions. A primary input cone 56 having an annular cross-section is mounted on the primary input carrier by means of a splined or keyed connection 57 so that the cone rotates with the carrier but is free to slide axially along it. A secondary input cone 58 is mounted on secondary input carrier 53 in the same way by means of a splined or keyed connection 59 so that the secondary input cone is free to slide axially on the secondary input carrier but rotate together with it. The cone angle of the secondary cone is equal to that of the primary input cone.

A number of intermediate drive shafts 60 are journalled in housing 50, bevel gears 55 and hub casting 54 perpendicularly to the common axis of the input cones so that the intermediate shafts extend radially with respect to the two input cones. Each intermediate drive shaft has an intermediate drive cone 61 mounted on it by means of a splined connection 62 so that the intermediate cones are free to slide along their respective shafts but rotate with it. Each intermediate shaft 60 also has a bevel gear 63 fixed to it and bevel gears 63 mesh with a planetary drive ring 64 which is journalled on output shaft 65. Output shaft 65 is, in turn, journalled in hub casting 54 and primary input carrier 52 by means of suitable bearings as shown. Planetary drive ring 64 engages with planet pinions 66 which are carried on primary input carrier 52 which thus functions as the planet carrier for this planetary gear train. Sun gear 67 is fixed to output shaft 65 so that the drive is transmitted from intermediate shafts 60 through bevel gears 63 to the planetary drive ring 64 and thence through pinions 66 to the sun gear 67 and output shaft 65.

The intermediate cones 61 have a cone angle equal to the supplement of the input cone angle (180° — the input cone angle) so that the conical faces of the intermediate cones will come into line contact with the conical drive faces 70 and 71 of the input drive cones when the input cones are urged towards each other and the intermediate cones are urged radially inward. To urge the primary and secondary input cones together a loading system is provided which comprises a primary input cone loading ring 72 which can slide axially along hub member 73 and which bears against primary input cone 56 through thrust bearing 74. A similar loading ring 75 which is axially sliable on hub 54 bears on secondary input cone 58 by means of thrust bearing 76. Loading rings 72 and 75 transmit thrust from hydraulic rams 77 to the input cones to move them axially towards each other into driving contact with intermediate cones 61. Each intermediate cone 61 has a loading system comprising loading ring 80 which bears against the intermediate cone through thrust bearing 81 and hydraulic ram 82 with a divided thrust rod 83 for providing even loading on the loading ring 80. Drive ratios may be changed by varying the hydraulic pressure in rams 77 or 82 or both, through a pressure control system.

The rams, in this case, are shown distributed around the cones but by a suitable use of levers the number of rams could be reduced, e.g. to two.

Figure 4:
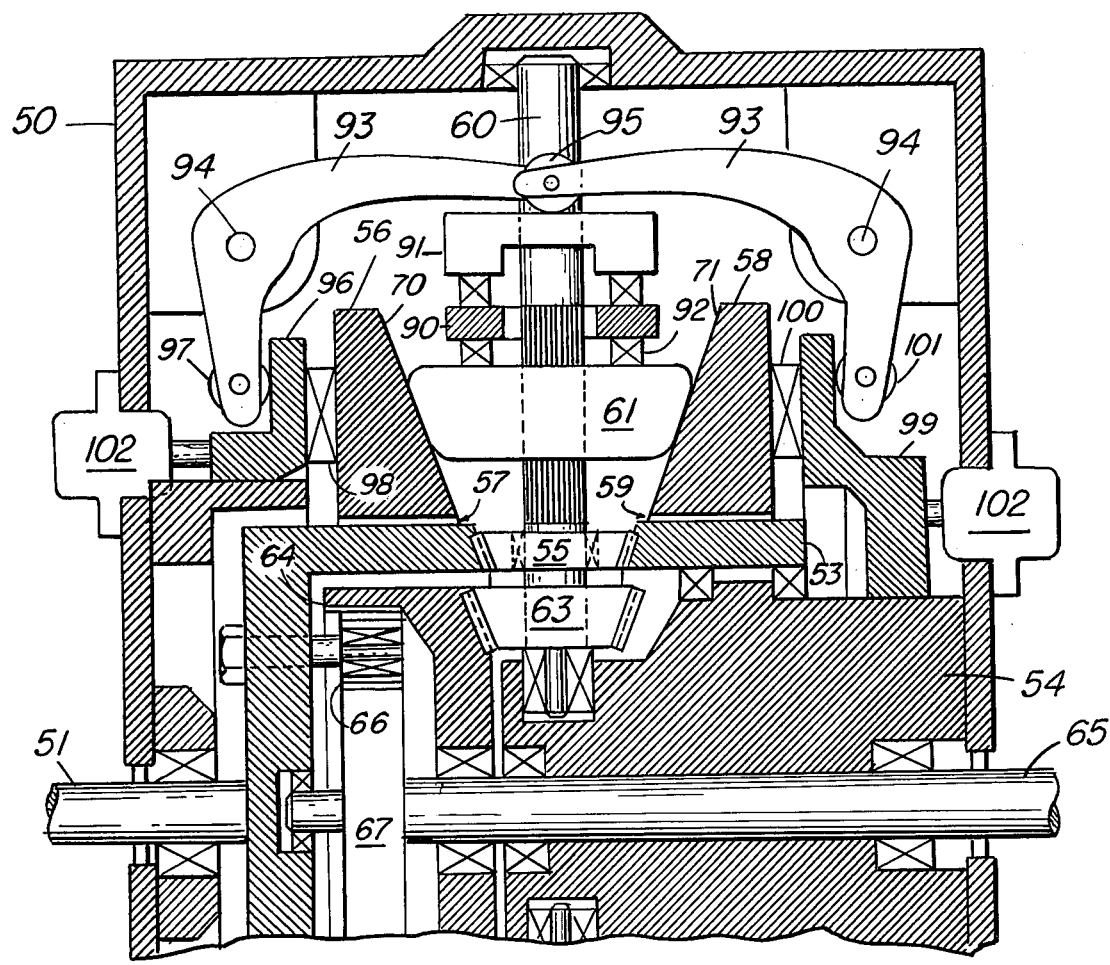
FIG. 4 is a fractional section of another form of traction drive.

An alternative loading system is shown in FIG. 4. In this case, each intermediate cone 61 has a ball-ramp torque-sensitive loading system (cam-and-ball contact pressure generator) with cam loading rings 90 and 91. Thrust bearing 92 transmits the loading forces to cone 61. A pair of bell crank levers 93 pivoted on housing 50 at pivots 94 press on loading ring 91 through rollers 95. The other ends of bellcranks 93 press on a loading ring 96 for primary input cone 56 through rollers 97. Thrust bearing 98 transmits the thrust to input cone 56. A similar loading system is provided for the secondary input cone 58, comprising loading ring 99 with associated thrust bearing 100 which are acted upon by bellcrank 93 through rollers 101. This loading system provides the desired co-ordinated movement of the input cones with the intermediate cones: as the input cones are urged together, the movement of the bellcranks permits the intermediate cones to move radially outwards to change the speed ratio of the drive. Frictional driving engagement between the input cones and the intermediate cones is assured by the torque-sensitive ball ramp loading system. Change in ratio is obtained by means of rams 102 acting on the input cone loading rings 96 and 99.

Whatever the loading system is used, it must ensure first, that the cones remain in the correct position for the speed ratio desired (since the relative position of the intermediate cones on their shafts and the input cones on their carriers determines the speed ratio), second, that sufficient loading is maintained between the input and the intermediate cones to transmit the power and third, that the cone movements required to effect a drive ratio change can be provided while the drive is transmitting power. Thus, the loading system must coordinate cone movement with requisite loading. The loading system shown in FIG. 4 achieves this readily by virtue of its internal construction but the system shown in FIG. 3 requires an exterior control system to operate the rams. The control system need not be described here since its nature and construction will be apparent to the skilled engineer.

For example, hydraulic loading system of the type shown in FIG. 3 could have the rams for the intermediate and input cones all connected in the same hydraulic circuit so as to provide a balanced system (suitable proportioning of the ram cylinders will ensure a constant volume circuit so that no fluid need be transferred as the ratio is changed.) The speed ratio can then be changed by having an auxiliary ram act on the intermediate cones to move them to the desired position. A ball ramp loading system is particularly advantageous because it will vary the loading according to the torque. The loading will then be light when the torque is low and correspondingly higher when the torque increases. This means that the average load over a period of time will be reduced because the drive will not always be operating at peak torque (and hence, peak power). The peak loading can therefore be increased without imposing a continuous high load on the cones. This, in turn, means that the size of the drive can be reduced for a given power throughput.

For some applications, especially light-duty applications it would be possible to use a spring-loaded system to obtain self-adjustment of cone position whilst maintaining constant cone loading. For example, in the system of FIG. 3, rams 77 could be replaced by a number of constant-rate springs around loading rings 72 and 75 so that as ram 82 urged the intermediate cones 61 inwards, the input cones would be urged outwards against the springs and when thrust rod 83 was withdrawn, the springs would force the input cones together again, thus forcing the intermediate cones radially outwards along their shafts until further movement is stopped by the action of ram 82. The loading on the cones would be determined by selection of the spring rate. Alternatively, a spring could be provided to load each intermediate cone radially inwards, replacing ram 82 and thrust rod 83. In this case, the speed ratio would be set by operating rams 77 to produce the desired positioning of the intermediate cones.

The speed ratio can, of course, be set manually through the control system or automatic control can be employed. In the case of a road vehicle, for example, the speed ratio can be varied automatically in response to throttle opening, road speed and engine speed.

The number of intermediate cones may be varied according to the requirements of the unit. Although the drive has been described above (FIGS. 1 and 2) with six intermediate cones, the use of fewer will often be advantageous. As the number of intermediate cones is reduced, they can be made larger. The torque on the intermediate shafts will then be increased proportionately to the increase in radius of the cones, thus giving a similar total torque (and, therefore, power transmission) for the same total maximum loading on the cones. The drive will then have fewer parts and be of simpler design. Instead of the six cones shown for purposes of illustration in FIGS. 1 and 2, three intermediate cones will be preferred in many cases.

The planetary gear train shown in FIGS. 3 and 4 is purely exemplary. The particular train shown gives a wide range of speed ratios but if this is not important, a different configuration could be employed. For example, a higher torque output with a reduced range of speed ratios could be obtained by having the input shaft driving the planet ring, the intermediate cones driving the sun gear and the output shaft coupled to the planet carrier. Also, the gear train can be arranged so that an intermediate position of the intermediate cones (e.g. half or one quarter the way along the face of the input cones) will give a zero speed output and cone positions either side of the selected intermediate position a forward or reverse direction output.

The drive has been described with reference to the use of gears for providing internal drives. However, it is possible to use traction drives instead of gears. This will simplify lubrication problems because the lubrication requirements for all the internal drives will then be the same. To illustrate, the bevel gear drives shown in FIGS. 3 and 4 can be replaced by conical traction drives and the planetary gear drive by a suitable fixed ratio traction drive of the conical or spherical roller type. In these cases, loading can suitably be applied by ball ramp loading systems.

The various components will, of course, be constructed of the appropriate materials. The rolling elements (input cones, intermediate cones and other traction drive elements) will normally be of steel or other material having high fatigue strength and ability to resist damage due to high contact stress. Double vacuum remelted steels are suited to this purpose but the reduced stresses encountered in the present drive may lead to relaxations in specification requirements.

As previously stated, the cone angles will be determined so that when R (the input cone radius to the center of the line contacts) is at some value between its maximum and minimum permitted values, the projected apexes of all the cones (input and intermediate) will meet at a single point. The spin will then be zero. At other values of R, the spin will have a finite positive or negative value. Further analysis of the drive system will be given below, and in this analysis, the following symbols will be used:

$f$ — traction coefficient (fluid dependent)
$L$ — normal contact load (lbs.)
$M_o$ — Maximum output torque (ft. lbs.)
$n$ — number of intermediate cones
$N_i$ — input shaft speed (RPM)
$N_o$ — output shaft speed (RPM)
$P$ — power output (H.P.)
$R$ — mean rolling radius on the input cones (in.)
$R_{min}$ — minimum mean rolling radius on input cones (in)
$R_{max}$ — maximum mean rolling radius on input cones (in)
$R_1$ — mean rolling radius on intermediate cones (in)
$R_2$ — intermediate shaft bevel gear radius (in)
$R_3$ — planetary annulus bevel gear radius (in)
$R_4$ — sun radius (in)
$R_5$ — planetary annulus radius (in)
$t$ — line contact length (in)
$a$ — intermediate cone half angle (degrees)
$x_{max}$ — maximum contact stress (psi)
$y_{max}$ — maximum permitted circumferential stress (psi)
$z$ — slide-roll ratio at contact extremes Taking the drive shown in FIG. 3 as an example, with the zero spin position being at the half-speed point, i.e. where:

$$R = \frac{R_{min} + R_{max}}{2}$$

it can be shown from geometrical considerations that the half cone angle of the intermediate cones is given by:

$$\tan a = \frac{R_1}{R} = \frac{2R_1}{R_{min}\left(2 + \frac{R_4}{R_5}\right)} \quad (1)$$

The maximum permissible contact load is given by:

$$L = 1.9 \times 10^{-7} \cdot t \cdot (x_{max})^2 \cdot R_1 (\cos a)^{-1} \text{ lbs.} \quad (2)$$

This equation is derived from classical elasticity theory for line contact. From geometrical considerations, the maximum line contact length is given approximately by:

$$t = 2Z \cdot R_{min}\left(1 + \frac{2R_5}{R_4}\right) \text{ inches} \quad (3)$$

For an output speed range from zero to the input speed, the maximum torque which can be transmitted is given, from an analysis of the torque, by:

$$M_o = R_{min} \cdot \frac{R_4}{R_5} \cdot \frac{n}{6} \cdot f \cdot L \text{ ft. lbs.} \quad (4)$$

Combining equations 1 to 5 gives an equation for the maximum output torque of the machine in terms of the significant variables $$M_o = 1.6 \cdot 10^{-7} \cdot z \cdot f \cdot (x_{max})^2 (R_{min})^3 \left(2 + \frac{R_4}{R_5}\right)(\cos a)^{-1} \quad (5)$$

Other geometry equations are $$R_{max} = R_{min}\left(\frac{1 + R_4}{R_5}\right) \quad (6)$$

-continued $$\frac{R_2}{R_3} = \frac{R_1}{R_{min}} \qquad (7)$$

The number $n$ of rollers which can be accommodated will be a function of the rolling radius of the rollers and the minimum rolling radius of the input cones. Thus:

$$n = f\left(\frac{R_{min}}{R_1}\right),$$

hence $M_o$ is directly proportional to $$(R_{min})^3 \qquad (8)$$

The maximum speed at which the drive can operate is limited by the stresses due to centrifugal forces on the input cones. The maximum stress is a circumferential stress occurring at the inner edge of the ring, $y_{max}$. It can be shown that $y_{max}$ is directly proportional to $(N_i^2 R_{min}^2)$ (9)

Hence for a maximum permitted ring stress $N_i R_{min}$ = constant (10)

The maximum power output of the drive $P_{max}$ occurs when $N_o$ is a maximum (i.e., $N_o = N_i$) and $P_{max}$ is directly proportional to $M_o N_i$ (11)

From equation (8)

$M_o$ is directly proportional to $(R_{min})^3$ and from equation (10)

$N_i$ is directly proportional to $(R_{min})^{-1}$

Therefore from equation (11) the maximum power capability $P_{max}$ is directly proportional to $(R_{min})^2$ It will be noted from equation (5) that the maximum output torque is independent of the output speed, and hence this torque is available as starting torque at the drive shaft. Tables 1 and 2 below give examples of geometry and power/torque output capabilities of three different sized traction drives of this type neglecting drive losses. The power ratings given are based purely on theoretically possible traction force transmissions at the rolling contacts. Actual output power and speed limits will depend upon the availability and strength of components. A maximum slip value of ±1 percent has been assumed along with a traction coefficient of 0.08. In the light of the reduced contact stresses, it may, in certain cases, be possible to relax the slip limitation. This would allow a reduction of the value of the intermediate cone angle even to the point where flat plates and cylindrical rollers may be used instead of cones. This would greatly simplify the design of the machine.

It can be seen from Table 2 that a drive with $R_{min}$ = 4 in. is capable of handling automobile torque and power requirements. The engine may be operated at its optimum efficiency in the 1500–2000 rpm range. The massive nature of the input cones would remove the need for the engine flywheel and so the drive could be designed to fit directly on the engine crankshaft. There would be no need for a final drive reduction. The outside diameter of the input cones would be about 13 inches and allowing for a suitable cone loading system the overall dimensions of the drive would be 18 to 24 inches in diameter and 10 to 12 inches wide.

Table 1

| | Geometry of Three Different-sized Drives | | | | | | |
|---|---|---|---|---|---|---|---|
| $R_{min}$ in | $\frac{R_4}{R_3}$ | $R_{max}$ in | n | $R_1$ in | $a_{deg.}$ | z | $t_{in}$ |
| 2 | 0.5 | 3 | 6 | 0.84 | 18.5 | 0.01 | 0.2 |
| 4 | 0.5 | 6 | 6 | 1.67 | 18.5 | 0.01 | 0.4 |
| 6 | 0.5 | 9 | 6 | 2.50 | 18.5 | 0.01 | 0.6 |

Table 2

| Torque/Power Output Capabilities (assuming f = 0.08) | | | | | |
|---|---|---|---|---|---|
| $R_{min}$ in | $x_{max}$ psi | L lbs. | $M_o$ ft. lbs. | estimated $N_i$ max RPM | H.P. at $N_o = N_i$ max |
| 2 | 200,000 | 1346 | 108 | 18,000 | 372 |
|   | 300,000 | 3028 | 242 |  | 828 |
|   | 400,000 | 5384 | 431 |  | 1470 |
| 4 | 200,000 | 5353 | 856 | 9,000 | 1470 |
|   | 300,000 | 12044 | 1927 |  | 3300 |
|   | 400,000 | 21412 | 3426 |  | 5870 |
| 6 | 200,000 | 12021 | 2885 | 6,000 | 3294 |
|   | 300,000 | 27047 | 6491 |  | 7416 |
|   | 400,000 | 48084 | 11540 |  | 13200 |

It is emphasized that the foregoing values are purely theoretical illustrative values which are simply intended to represent the possibilities inherent in the drive.

The drive can be used with prime movers having an optimum fuel efficiency over a small speed range such as gasoline and diesel reciprocating engines, rotary piston engines and gas turbines. The capability of providing infinitely variable speed ratios would provide a means of securing good fuel utilization.

The maximum output torque is governed by the lubricant employed. In order to be capable of transmitting greater amounts of torque, lubricants with a high traction coefficient are used. Standard transmission lubricants have traction coefficients of about 0.04 to 0.06 but certain synthetic traction lubricants have coefficients as high as 0.08 or 0.09.

I claim:
1. An infinitely-variable speed ratio traction drive which comprises:
   aa. a housing
   bb. a first drive input carrier journalled for rotation within the housing,
   cc. a second drive input carrier journalled coaxially with the first input carrier for rotation within the housing,
   dd. means for driving the second input carrier at the same rotational speed as but in the opposite direction to the first input carrier,
   ee. a first drive input cone having a conical drive face, mounted on the first input carrier for rotation therewith and axial movement on the carrier,
   ff. a second drive input cone having a conical drive face opposed to the conical drive face of the first input cone, the cone angle of the drive face of the second cone being equal to that of the drive face of the first cone, the second input cone being mounted on the second drive input carrier for rotation therewith and axial movement thereon,
   gg. a plurality of intermediate drive shafts journalled in the housing, the shafts extending perpendicu- larly to the axis of the input cones and being disposed axially and stationary between the input cones, hh. an intermediate drive cone mounted on each intermediate drive shaft for rotation therewith and moveable along the shaft, all the intermediate drive cones being uniform size and shape and having a cone angle equal to the complement of the cone angle of the conical drive faces of the input cones, ii. means for urging the first and second input cones relatively towards each other and into contact with the intermediate drive cones whereby line contact between (i) the conical drive face of the first input cone and the conical drive face of the intermediate cones and (ii) the conical drive face of the second input cone and the conical drive face of the intermediate cones takes place, jj. means for urging the intermediate cones along their respective intermediate drive shafts into contact with the first and second input cones, kk. an output shaft ll. means for driving the output shaft from the intermediate shafts.

2. A traction drive according to claim 1 in which the means (ii) for urging the first and second input cones relatively towards each other comprise:
   mm. hydraulic rams acting upon the first and second input cones.

3. A traction drive according to claim 1 in which the means (jj) for urging the intermediate cones along their respective intermediate drive shafts comprise:
   nn. a hydraulic ram acting upon each intermediate cone.

4. A traction drive according to claim 1 in which the means for urging the first and second input cones relatively towards each other and the intermediate cones along their respective intermediate drive shafts comprise:
   oo. a pair of bellcranks for each intermediate drive shaft, the bellcranks being pivotted on the housing, one of each pair of bellcranks having one arm acting upon the intermediate cone and its other arm acting upon the first input cone, the other bellcrank of each pair having one arm acting upon the intermediate cone and its other arm acting upon the second input cone, whereby relative movement of the first and second input cones and the intermediate cones is coordinated with continuous line contact between the cones.

5. A traction drive unit according to claim 1 in which the cone angles of the first and second input cones are such that the projected apexes of the first, second and all intermediate cones meet at a single point when the intermediate cones are in a position partway across the conical drive faces of the first and second input cones.

6. A traction drive unit according to claim 1 in which the means (dd) for driving the second input carrier comprise:
   pp. a plurality of gear pinions engaging the first and second input drive carriers.

7. A traction drive unit according to claim 6 in which the gears (pp) are journalled on the intermediate drive shafts.

8. An infinitely variable ratio traction drive which comprises:
   a. a first drive member,
   b. a first drive cone having a conical drive face and being slidably mounted on the first drive member for rotation therewith and axial movement thereon,
   c. a second drive member coaxial with the first drive member,
   d. means for rotating the second drive member at the same rotational speed as and in the opposite direction to the first drive member,
   e. a second drive cone slidably mounted on the second drive member for rotation therewith and axial movement thereon, the second drive cone having a conical drive face of the same cone angle as that of the first drive cone,
   f. a plurality of intermediate drive shafts extending radially with respect to the axis of the first and second drive cones, and being axially stationary with respect to said first and second drive cones.
   g. a conical intermediate drive member slidably mounted on each intermediate drive shaft for rotation therewith,
   h. means for moving the intermediate drive members along their respective drive shafts and for maintaining driving frictional contact between the intermediate drive members and the first and second drive cones,
   i. an output shaft,
   j. means for driving the output shaft from the intermediate shafts.

9. A traction drive according to claim 8 in which means (j) comprises:
   k. hydraulic ram means for urging the conical intermediate drive members radially along their respective intermediate drive shafts, and
   l. hydraulic ram means for urging the first and second drive cones axially towards each other.

10. A traction drive according to claim 8 in which means (j) comprises:
    m. first loading means for urging the intermediate drive members radially along their respective intermediate drive shafts,
    n. second loading means for urging the first and second drive cones axially towards each other, and
    o. bellcrank levers connecting the first and second loading means whereby the conical intermediate drive members are urged radially inward along their respective intermediate drive shafts as the first and second drive cones slide axially apart, to maintain driving frictional engagement between the intermediate drive members and the first and second drive cones.

11. A traction drive according to claim 10 in which the first loading means comprises ball ramp torque-sensitive loading means.

12. A traction drive according to claim 8 in which the means for driving the output shaft from the intermediate shafts comprises:
    p. a planetary gear system comprising a sun wheel, planet wheels and a ring gear, the sun wheel being carried on the output shaft, and
    q. means for driving the ring gear from the intermediate shafts.

* * * * *